United States Patent

Harris

[15] 3,658,035
[45] Apr. 25, 1972

[54] COLLAPSIBLE AQUARIUM
[72] Inventor: Jack Harris, Forest Hills, N.Y.
[73] Assignee: Samuel Rosenberg, County of Kings, N.Y. a part interest
[22] Filed: Feb. 6, 1970
[21] Appl. No.: 9,146

[52] U.S. Cl.................................................119/5
[51] Int. Cl.........................................A01k 64/00
[58] Field of Search.......................119/5, 3; 220/6, 7

[56] References Cited

UNITED STATES PATENTS

| | | |
|---|---|---|
| 2,763,239 | 9/1956 | Rendall..................................119/5 |
| 1,852,597 | 4/1932 | Taylor et al............................119/5 |
| 2,811,275 | 10/1957 | Draper....................................220/7 |
| 3,244,145 | 4/1966 | Braunhut................................119/5 |

*Primary Examiner*—Hugh R. Chamblee
*Attorney*—Sheldon Palmer

[57] ABSTRACT

An aquarium of the type having a base and four sides wherein each of the four sides is hingedly secured to the base, and in water-tight relation with the base, and further wherein each side is in water-tight relation with the two sides adjacent to it.

16 Claims, 16 Drawing Figures

PATENTED APR 25 1972 3,658,035

INVENTOR.
JACK HARRIS

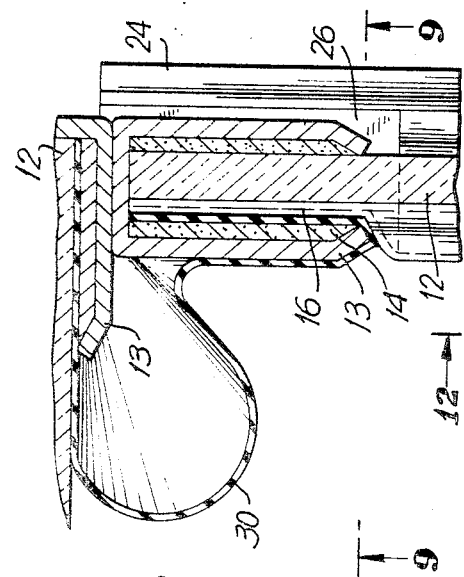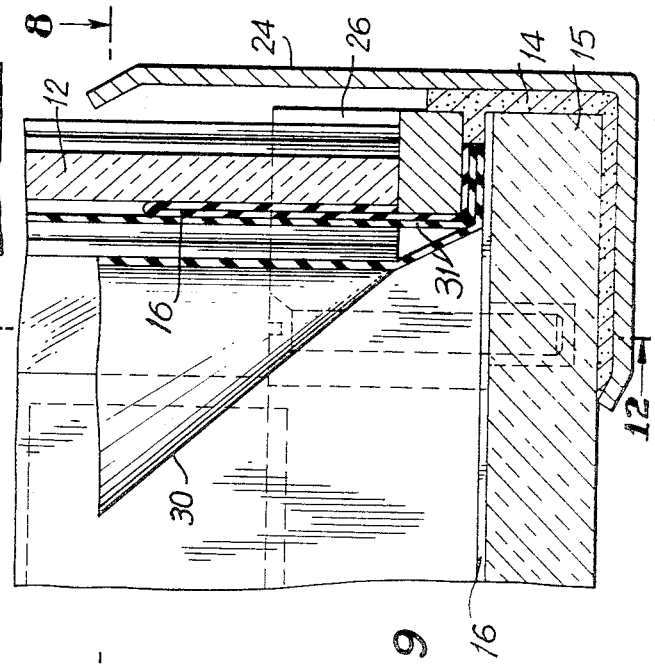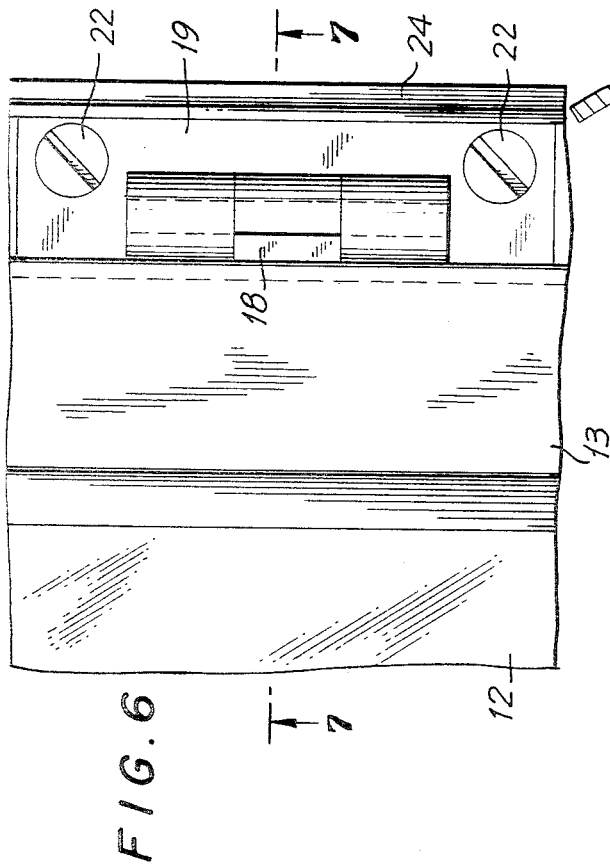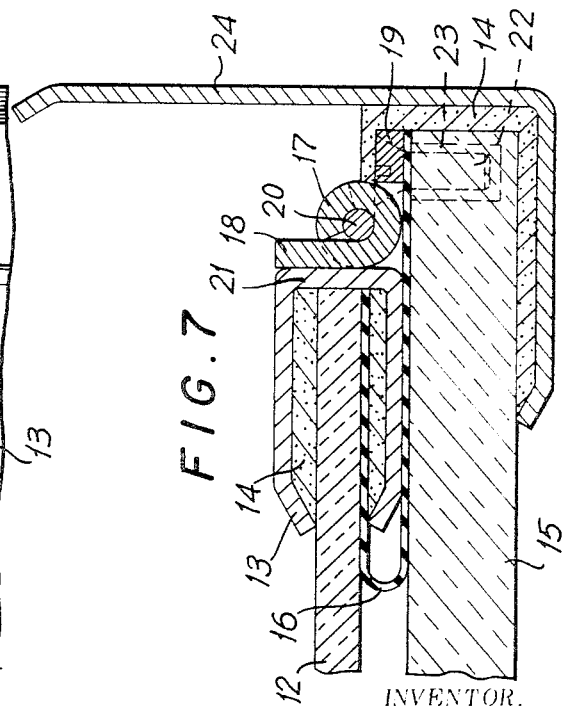

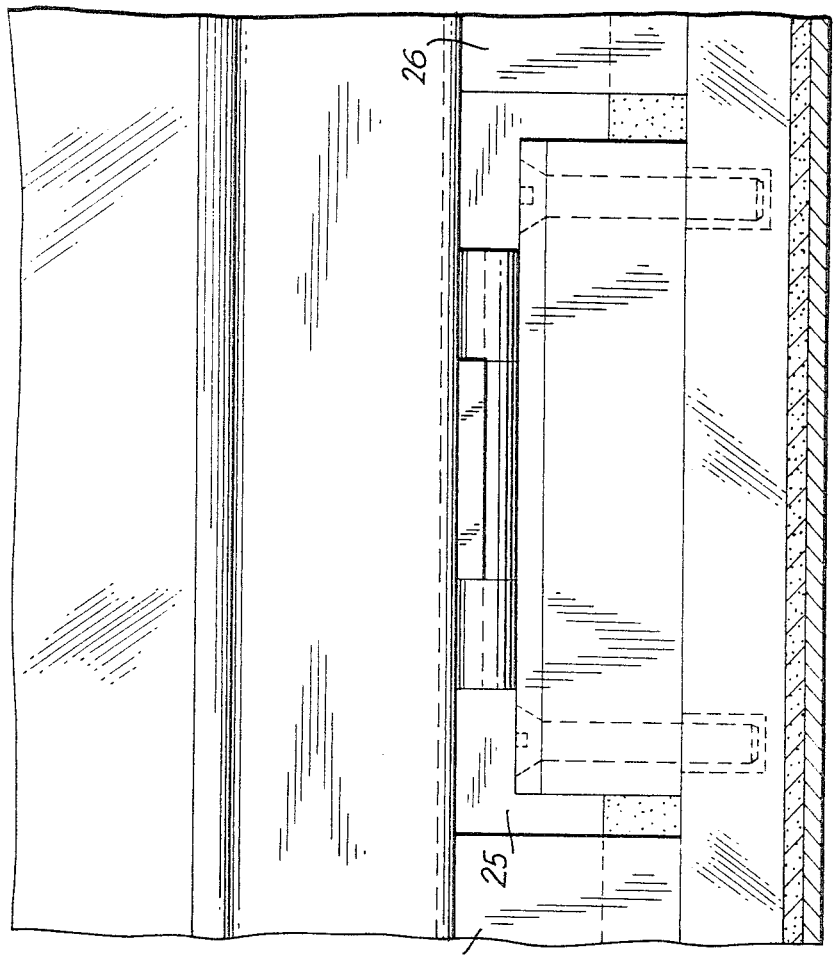
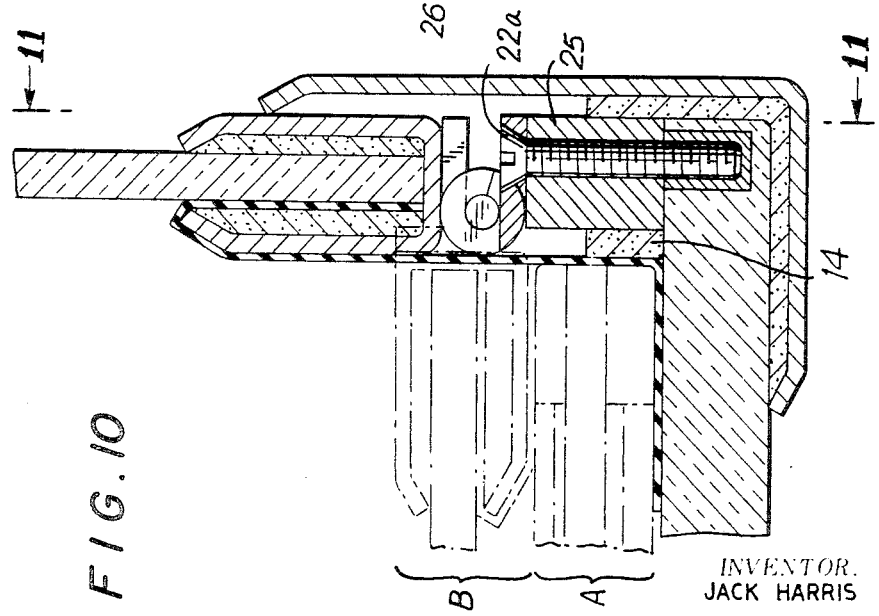

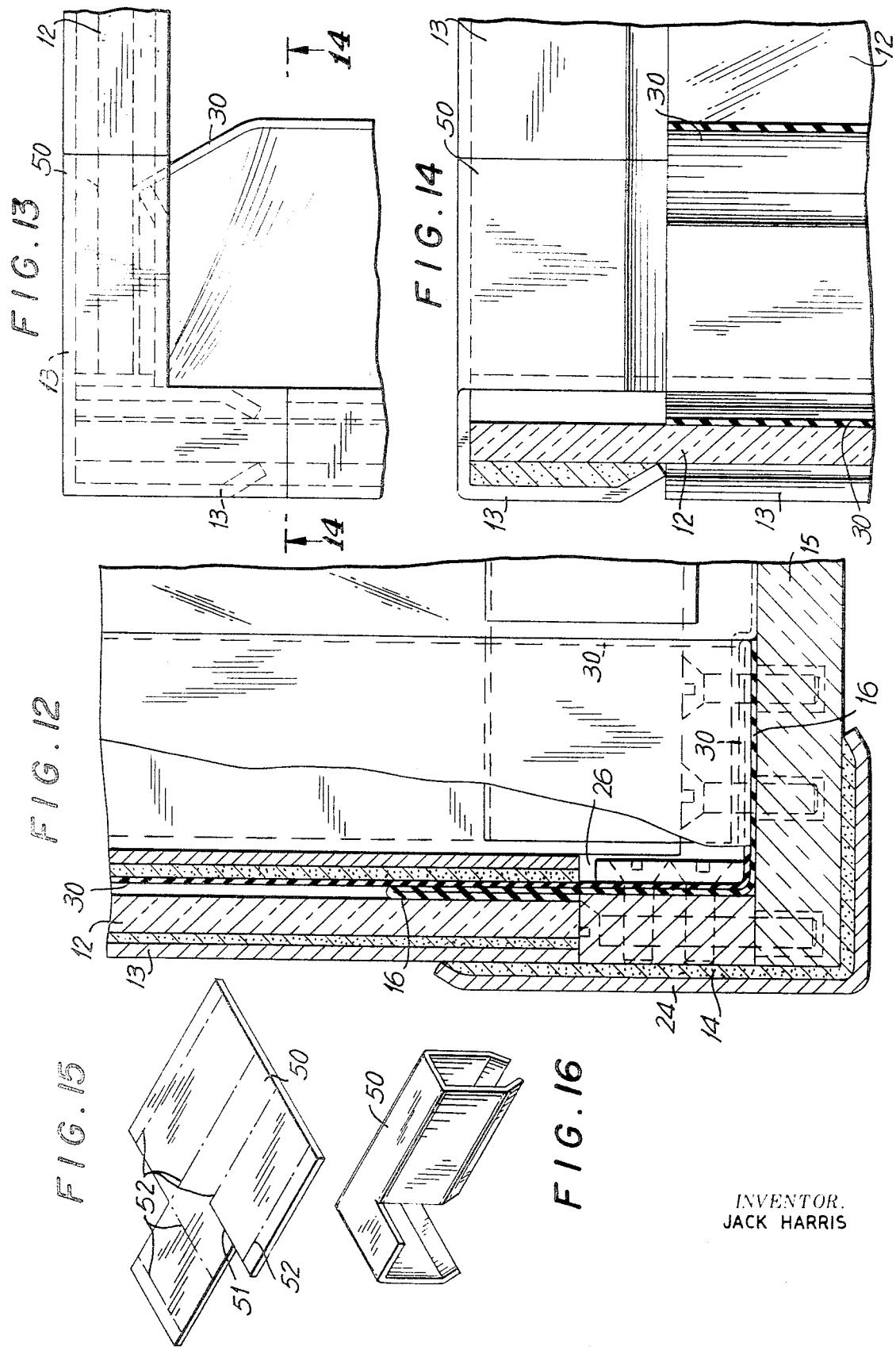

COLLAPSIBLE AQUARIUM

BACKGROUND OF THE INVENTION

1. Field of the Invention

The invention relates to aquaria, and more particularly to an aquarium which is stored and shipped in a folded, or collapsed position and which is opened to an upright position when ready for use.

2. Prior Art

There are known water-tight aquaria. However, there has not heretofore been known any aquarium which is collapsible for storage and shipping and which at the same time is completely water-tight when in its open, or upright position.

SUMMARY OF THE INVENTION

The present invention has for a principal object the provision of a foldable, collapsible, water-tight aquarium. Under present conditions all aquaria are fabricated in their finished state, that is, upright, fixed and ready for use. When storing or shipping these aquaria from their point of manufacture to their point of sale, very large volumes of valuable space are wasted and the incidence of breakage of the glass used in the aquaria is very great. It would be very desirable for the manufacturer, the shipper and the retailer of aquaria to have a collapsible aquarium since such an aquarium would be readily transportable and storable at a tremendous saving in space and cost.

With this, and other objects in mind, I have now provided the solution to the above problems. In completing this invention, there have been solved several problems, chief among which are the problem of providing at the same time, and in a practicable and efficient manner, a hinged water-tight seal between the upright sides of an aquarium and the base thereof and also between adjacent sides thereof.

In accordance with the invention, there is provided an aquarium comprising a base and four sides, each of said sides being hingedly secured to the base with a water-tight seal means between each side and the base. Additionally, there is provided a water-tight seal means between each side and the two sides adjacent thereto. In the preferred embodiment of the invention, the means by which the sides are hingedly secured to the base is a hinge having respective face plates fixed to the base and the side; and the water-tight seal means is a sheet of flexible material connected to both the base and the side. Preferably the flexible material is polyethylene since this is an inexpensive material which is easy to work with and is generally transparent. However, any flexible, water-proof material may be substituted, and in fact it may in some cases be desirable to use a colored flexible material for esthetic purposes. The cement to be used for cementing the flexible material must of course be waterproof and it must be capable of bonding the flexible material to glass, metal and slate. The mastic which is conventionally used in aquaria is sufficient to bond the flexible material and is the preferred cement for use in the present invention.

BRIEF DESCRIPTION OF THE DRAWING

In the drawing which shows the detailed construction and manner of opening the collapsed aquarium;

FIG. 6 is a plan view of the side shown in FIG. 5 with the side in the collapsed position (with the side down);

FIG. 7 is a section through line 7—7 of FIG. 6 showing the side down;

FIG. 8 is a plan section through a corner of the aquarium with a side and the back (or front) in the upright position. This view is through line 8—8 of FIG. 9;

FIG. 9 is a section through line 9—9 of FIG. 8 of the side near the corner;

FIG. 10 is a section through the front (or back) at the hinge;

FIG. 11 is an elevation through line 11—11 of FIG. 10 at the hinge;

FIG. 12 is a section through the front (or back) near the corner;

FIG. 13 is a plan view of a corner with the sides in the upright position with the corner clip of FIG. 16 in place;

FIG. 14 is an elevation section through line 14—14 of FIG. 13;

FIG. 15 is the layout of the corner clip of FIG. 16 before it is formed into shape; and FIG. 16 is the corner clip assembly ready for mounting at a corner of the upright aquarium.

DETAILED DESCRIPTION OF THE INVENTION

Figure 1:
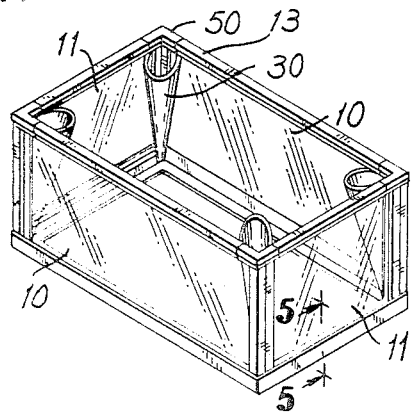
FIG. 1 is a perspective view of the fully opened aquarium ready for use.
Figure 2:
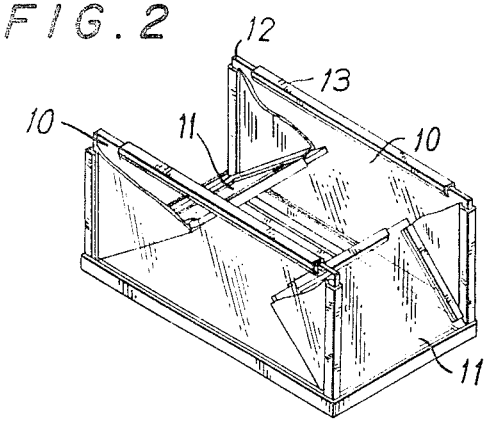
FIG. 2 is a perspective view of the aquarium partly opened with the front and back in the upright position and the two sides partly upright.

There will now be described in detail, the construction and operation of the aquarium of the present invention given in conjunction with the appended drawing in which like parts shown in the several figures of the drawing are assigned the same reference numeral.

In the aquarium, there are as shown in FIGS. 1–4, four sides constituted by two pairs of sides. One pair of sides 10 is longer than the other pair of sides 11; the longer pair being hereinafter called front and back 10 while the shorter sides are called simply sides 11.

Figure 5:
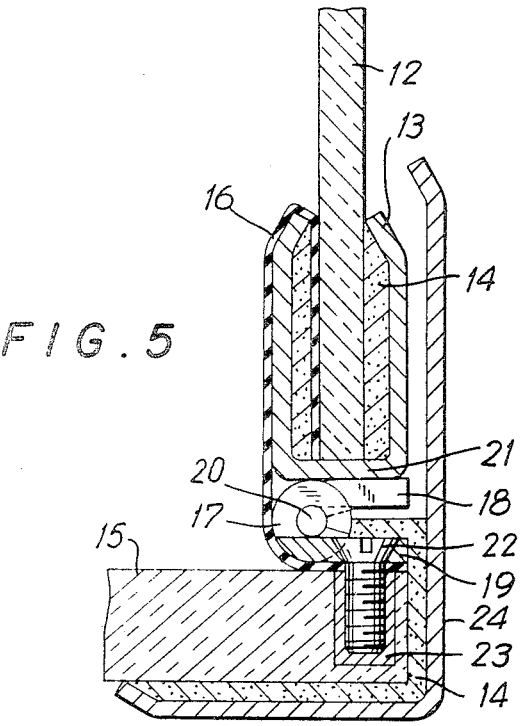
FIG. 5 is a section through line 5—5 of FIG. 1 showing the side at the hinge with the side in the upright position.

Each of the four sides 10 and 11 has the same construction and this will now be described. Each side comprises a rectangular sheet of glass 12 having four U-shaped frame members 13 cemented to each of its four edges by means of a conventional water-proof aquarium mastic 14 (FIG. 5). Each of the U-shaped frame members 13 is slightly shorter than the edge to which it is cemented as clearly shown in FIG. 3. The U-shaped frame members are made, for example, of stainless steel or some other convenient material which can be readily formed into the desired shape.

Each of the four sides 10 and 11 is secured to a base 15 made of slate. The front and back 10 are secured to the base 15 in a slightly different manner than are sides 11 and there will now be described the manner in which front and back 10 and sides 11 are so secured.

In FIG. 5, glass 12 cemented to U-shaped frame member 13 by mastic 14 comprises a side 11. On the inner surface of side 11, running for substantially the entire length of the side there is provided a rectangular sheet of flexible material 16 which is preferably polyethylene. One edge of this flexible material 16 is cemented between glass 12 and U-shaped frame member 13 by means of the same mastic 14 which bonds glass 12 to U-shaped frame member 13. A hinge 17 comprising plates 18 and 19 rotatable about a pin 20 is used to secure side 11 to base 15. The hinge is as wide as the combined width of glass 12 and U-shaped frame member 13. Plate 18 of hinge 17 is spot welded or otherwise fixed to the short side 21 of U-shaped frame member 13. Plate 19 of hinge 17 is secured to base 15 by means of screw 22 which passes through a hole in plate 19 and is threaded into steel plug 23 which is set into base 15. The steel plug 23 or its equivalent is necessary since a screw cannot be threaded into slate without splitting or cracking the slate. Before plate 19 is screwed into base 15, the other edge of flexible material 16 is passed under plate 19 and screw 22 passes through flexible material 16. Thus, rectangular sheet of flexible material 16 must be as long as the side to which it is cemented and wide enough to sit in U-shaped frame member 13, extend along the outer surface thereof and pass completely under plate 19. When all four sides 10 and 11 have been secured to base 15, the entire assembly of the base and four sides is cemented into base frame 24 by mastic 14; thus as seen in FIG. 5, the side 11 is hingedly secured to base 15 between the upright position shown in FIG. 1 and the collapsed position shown in FIGS. 3 and 4. At the same time, there exists a water-tight seal between side 11 and base 15 provided by flexible material 16 and mastic 14. FIG. 7 shows the same portion of the aquarium when side 11 is down or collapsed.

Preferably, there will be two hinge assemblies on side 11 to provide a more sturdy connection between side 11 and base 15. There has been described above, the construction of one side 11. Clearly, the opposite side 11 is secured to base 15 in the same manner since both sides 11 open and close in an identical manner.

There will now be described the manner in which front 10 is secured to base 15.

In FIG. 10, the portion shown in phantom section A is the side 11 (in collapsed position) which is at right angles to front 10 which is about to be described. The portion shown in phantom section B is front 10 when it is in its collapsed position atop side 11. This is seen in FIG. 3 where front 10 is partially collapsed and in FIG. 4 where both front 10 and back 10 are in the fully collapsed position.

It is clear from FIG. 10 that the construction of front 10 is identical with that of side 11; and that the manner of cementing one edge of flexible material 16 between glass 12 and U-shaped frame member 13 is also identical. Likewise, the short side 21 of U-shaped frame member 13 is secured to plate 18 of hinge 17 in the same manner as in side 11. There is a difference however in the manner in which the hinged connection is made between front 10 and base 15. As seen in FIG. 10, there is provided a spacer 25 between plate 19 and base 15. This spacer 25 is necessary to allow for the thickness of side 11 when side 11 is in the down or collapsed position. It is shown in FIG. 10 that phantom section B, when collapsed, sits astride phantom section A and it is to provide the extra height, equivalent to the thickness of side 11, that spacer 25 is provided. As seen in FIG. 11, spacer 25 is as long as hinge 17. As with side 11, there are preferably at least two hinges 17 securing front 10 to base 15 and obviously there is at least one spacer 25 under each such hinge 17. In the zone between the two hinges 17, there are provided additional spacers 26 shown in FIG. 11. Spacers 26 are provided to give sturdiness to front 10 when it is in its upright position. Spacers 26 act in the capacity of stops to prevent front 10 from being rotated past a position perpendicular to base 15 and thus have the effect of sturdying and steadying the entire assembly. Naturally, while spacers 25 are mainly to provide height for front 10, they also act as stops. As seen in FIG. 11, spacer 26 is higher than spacer 25 and in fact has a height equal to the combined heights of spacer 25 and hinge 17; the spacers 25 and 26 are cemented to base 15 by mastic 14. In the case of spacers 26, the top surface is not secured to any part of the front 10, but front 10 merely rests on said top surface when front 10 is in the upright position. Spacers 25, on the other hand are secured to plate 19 of hinge 17 by screw 22a which passes through plate 19 and spacer 25 and is threaded in steel plug 23. Screw 22a is longer than screw 22 to allow for the thickness of spacer 25. The other edge of flexible material 16 is not passed under spacer 25 in the same manner as with side 11, but instead is folded away from front 10 toward the inside of the aquarium and is cemented to base 15 by mastic 14. The spacers 25 and 26 may be made of any material which can be cemented with mastic 14 and can, for example, be lucite, wood, a solid block of metal or a hollow extruded length of metal.

Figure 3:
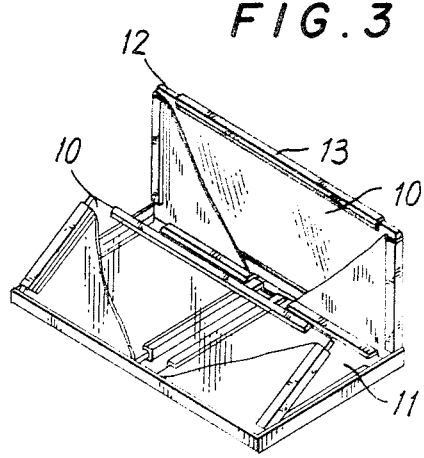
FIG. 3 is a perspective view of the aquarium partly opened, with the back in the upright position, the front partly upright and the two sides in the collapsed position.
Figure 4:
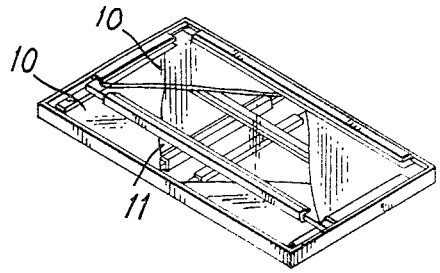
FIG. 4 is a perspective view of the aquarium in its fully collapsed position.

Since, in the collapsed position, sides 11 are lowermost or nearest the base, and front 10 is next in order atop sides 11, the last side down is back 10 as shown in FIGS. 3 and 4. Obviously when sides 11 and front 10 are collapsed, the construction of back 10 must be a modification of front 10 since there will now have to be compensated for not only the thickness of side 11 but also the thickness of front 10. Accordingly, for back 10, the spacer 25 will be higher than that for front 10. In fact, the spacer 25 for back 10 will have a height equal to twice that of spacer 25 for front 10; and correspondingly, spacer 26 for back 10 will have a height equal to the combined height of spacer 25 for back 10 and hinge 17. The construction of the hinge assembly and spacers for back 10 is not illustrated since it is exactly the same as shown in FIGS. 10 and 11 for front 10 except for the different height of the spacers 25 and 26.

In the embodiment shown, front 10 will always be collapsed before back 10 and conversely, back 10 will always open before front 10. The exact opposite configuration can be achieved by reversing front and back 10 and the respective spacers 25 and 26. Thus, it will be understood that whenever used herein, front and back are interchangeable terms, one long side being called front and the other back, for the sake of convenience only.

Until now, the construction of sides 11 and front and back 10 have been described in detail and the manner of connecting same to base 15 has been described. In accordance with said description, each of the four sides is hingedly secured to base 15 and in water-tight relation herewith.

There will now be described the construction of the water-tight connection between adjacent sides.

Until now reference has been made to U-shaped frame member 13, which is cemented to the lower edge of glass 12 with flexible material 16 cemented therebetween for connection to base 15.

In the following portion of the description, when U-shaped frame member 13 is referred to, it will be understood that reference is specifically being made to the U-shaped frame member 13 which is cemented to the side edges of glass 12 and when flexible material 30 is referred to, reference is being had to the material which is used in effecting the water-tight seal between adjacent sides of the aquarium.

In FIG. 8, looking down into a corner of the aquarium, there are shown a side 11 and the front (or back) 10 both in the upright position at right angles to one another. In FIG. 9, there is shown a section through side 11 near the corner. Base frame 24 surrounding the lower part of the aquarium is seen in both views, as is spacer 26. Flexible material 16 which seals side 11 to base 15 is seen in phantom in FIG. 8.

In FIG. 9, flexible material 16 which seals side 11 to base 15 is seen near the corner beyond the end of the U-shaped frame member 13 running along the lower edge of the glass, which, as described above, does not extend for the entire length of the said edge of glass 12. Thus, since this view does not show U-shaped frame member 13, the flexible material 16 is folded upon itself with no space between the folds. Directly atop base 15 in FIG. 9, there is seen a portion of flexible material 16 which seals front 10 to base 15.

The means by which the water-tight seal is effected between adjacent sides at the corners is shown generally in FIGS. 1–4. In these views, there is seen a conical piece of flexible material 30 having its apex at the lower corner of the aquarium. The cone formed of said flexible material is large enough so that when the sides are collapsed, there is sufficient material for all sides to lay flat on base 15. In FIG. 8, flexible cone 30 is shown forming a water-tight seal between adjacent sides. The U-shaped frame member 13 is cemented to the side edge (i.e. the edge running from the top to the bottom of the side) of side 11 by mastic 14. On the inner surface of side 11, running from the top of the side and extending beyond the lower end of U-shaped frame member 13 and glass 12, one edge of a rectangular sheet of flexible material, which is to be ultimately formed into cone 30, is cemented between glass 12 and U-shaped frame member 13. The flexible material 30 is folded back outside U-shaped frame member 13 and the other edge thereof is cemented between glass 12 and U-shaped frame member 13 of front (or back) 10. Between the two edges of rectangular sheet 30, the remaining material falls naturally into the shape of a cone, open at the top and having an apex at the bottom. As noted above, the said one edge of flexible material 30 extends beyond the lower end of side 11 and obviously the other edge of flexible material 30 extends beyond the lower edge of front (or back) 10. As seen in FIG. 9, this extra material 31 brought together at the apex of the cone and is folded, under the lower edge of side 11 in the corner where it sits atop flexible material 16 which secures front 10 to base 15 and sits beneath flexible material 16 which secures side 11 to base 15. In this position, extra material 31 is cemented by mastic 14 and thus the corner of the aquarium is made completely water-tight. By forming cone 30 in the corner, it is not possible for water to pass from the interior of the aquarium to the exterior at the junction of adjacent sides. Thus, the sides are in water-tight relation with the base 15, the sides are in water-tight relation with one another and the lower corner where adjacent sides and base 15 come together are also in water-tight relation with one another.

In FIG. 12, which is a section through line 12—12 of FIG. 9, the corner construction is seen from a different aspect in order to further clarify same.

In FIG. 13, the view is of a corner looking down from above. At the corner, there is shown corner clip 50 which physically holds adjacent sides together. The details of corner clip 50 will be given below. There is seen in FIG. 13, a portion of cone 30 cemented between U-shaped frame member 13 and glass 12 and extending outward into the aquarium.

In FIG. 14, which is an elevation view through line 14—14 of FIG. 13, there is seen cone 30, one edge of which is cemented between U-shaped frame member 13 and glass 12. There is also seen a portion of a corner clip 50 and a portion of the glass 12 of front (or back) 10.

When all four sides are in the upright position, it is necessary to secure pairs of adjacent sides at the four corners. To accomplish this, there is provided corner clip 50 as shown in FIG. 1 in place at all four corners. FIG. 13 also shows corner clip 50 in detail above U-shaped frame member 13 (in Phantom) on the upright edges of side 11 and front 10.

FIG. 16 shows the complete corner clip 50 and FIG. 15 shows the layout of a piece of metal which is to be cut along score mark 51 shown thereon. Along score marks 52, the metal is to be bent so as to form the finished clip. When the metal piece is completely formed into corner clip 50, it is fitted over each of the four corners of the aquarium.

To collapse the aquarium for storage or shipping, the corner clips 50 are removed and the aquarium is collapsed, according to the sequence shown in FIGS. 1–4.

What I claim is:

1. A collapsible aquarium comprising a base and four sides, each of said four sides being hingedly connected to the base in water-tight relation with the base and with the two sides adjacent therewith, whereby the hingedly connected sides can be folded open, and when so opened, the four sides define, together with the base, a rigid, shape-retaining water-tight enclosure.

2. A collapsible aquarium comprising a base, four sides, connecting means for connecting each of said four sides to the base in movable relation therewith, each of said four sides being movable with respect to the base between two extreme positions, the first of said extreme positions being parallel to the base and the second of said extreme positions being at right angles to the base, first water-tight seal means connecting each of said four sides to the base and second water-tight seal means connecting each of said four sides with the two sides adjacent therewith, whereby, when said sides are in the second of said extreme positions, said sides define, together with the base, a rigid, shape-retaining water-tight enclosure and when said sides are moved into the first of said extreme positions, the aquarium is collapsed.

3. An aquarium according to claim 2 wherein all four sides are of equal height, and said four sides comprise two pairs of sides having different lengths, the longer pair of sides being at least twice the height of the sides.

4. An aquarium according to claim 3 wherein the connecting means connecting each of the shorter sides to the base comprises at least one hinge having two plates, one plate being fixed to each of the sides and the other plate being fixed directly to the base; the connecting means connecting the longer sides to the base comprising at least one hinge having two plates and a spacing means having a height equal to the thickness of the side; one plate being fixed to the longer side and the other plate being fixed to the spacing means which is fixed to the base; the connecting means connecting the other of the longer sides to the base being the same except that the spacing means has a height equal to twice the thickness of the side.

5. An aquarium according to claim 4 wherein the first plate is connected to the base by means of a screw passing through a hole provided in said one plate.

6. An aquarium according to claim 4 wherein each of said sides comprises a rectangular sheet of glass and a U-shaped frame member attached to each edge of said sheet of glass, and cemented thereto, said other plate of the hinge being fixed to the U-shaped frame member attached to the lowermost edge of the sheet of glass.

7. An aquarium according to claim 6 wherein said other plate of the hinge is spot welded to the U-shaped frame member attached to the lowermost edge of the sheet of glass.

8. An aquarium according to claim 6 wherein the first water-tight seal means comprises, in the case of the shorter sides, a sheet of flexible material having a length equal to the shorter side, one edge of said sheet of flexible material being cemented for substantially its entire length between the sheet of glass and the U-shaped frame member associated with the lowermost edge thereof and the other edge of said sheet of flexible material being fixed between the base and the said other plate of the hinge.

9. An aquarium according to claim 6 wherein the first water-tight seal means comprises, in the case of the longer sides, a sheet of flexible material having a length equal to the longer side, one edge of said sheet of flexible material being cemented for substantially its entire length between the sheet of glass and the U-shaped frame member associated with the lowermost edge thereof and the other edge of said sheet of flexible material being cemented to the base and the spacing means.

10. An aquarium according to claim 6 wherein the second water-tight seal means comprises a rectangular sheet of flexible material formed into a cone joining adjacent sides of the aquarium said rectangular sheet of flexible material having a first edge cemented between the sheet of glass and the U-shaped frame member which is attached to a side edge of one side of the aquarium and a second edge cemented between the sheet of glass and the U-shaped frame member attached to a side edge of the side of the aquarium, adjacent said one side; and wherein the apex of the cone is folded under said one side.

11. An aquarium according to claim 2 comprising a base frame to which the base is cemented.

12. An aquarium according to claim 6 comprising means for clamping adjacent sides together in fixed position.

13. An aquarium according to claim 12 wherein the means for clamping comprises a clip which fits over the U-shaped frame members of adjacent sides.

14. An aquarium according to claim 10 wherein the flexible material is a clear plastic material and further comprising a plurality of colored pebbles in each of the cones.

15. An aquarium according to claim 9 comprising a clip for holding the cone to one of the two sides joined thereby.

16. An aquarium according to claim 1 wherein each of said four sides is hingedly connected to the base by means of at least one hinge secured to said side and said base.

* * * * *

PO-1050
(5/69)

UNITED STATES PATENT OFFICE
CERTIFICATE OF CORRECTION

Patent No. 3,658,035               Dated April 25, 1972

Inventor(s) JACK HARRIS

It is certified that error appears in the above-identified patent and that said Letters Patent are hereby corrected as shown below:

Column 1, line 31: "there have been solved several problems," should read -- several problems have been solved, --; line 34: "an" should read -- the --. Column 5, line 29: "of a corner" should read -- of corner --.

Signed and sealed this 25th day of July 1972.

(SEAL)
Attest:

EDWARD M. FLETCHER, JR.           ROBERT GOTTSCHALK
Attesting Officer                   Commissioner of Patents

PR